United States Patent [19]

Aizawa et al.

[11] 4,427,741

[45] Jan. 24, 1984

[54] POLARIZING FILM

[75] Inventors: Kaoru Aizawa; Yozo Oishi; Tatsuya Kubozono, all of Osaka, Japan

[73] Assignee: Nitto Electric Industrial Co., Ltd., Osaka, Japan

[21] Appl. No.: 288,872

[22] Filed: Jul. 31, 1981

[30] Foreign Application Priority Data

Jul. 31, 1980 [JP] Japan ................... 55-106009
Sep. 30, 1980 [JP] Japan ................... 55-137220

[51] Int. Cl.$^3$ ............... G02B 5/30; B32B 27/34; B32B 27/36
[52] U.S. Cl. .................... 428/332; 350/337; 350/370; 427/163; 428/1; 428/339; 428/411; 428/412; 428/419; 428/480; 428/483; 428/476.1; 428/476.3
[58] Field of Search ........... 427/163; 350/370, 337; 428/1, 418, 419, 425.8, 413, 910, 412, 480, 332, 339, 483, 476.1, 476.3, 411

[56] References Cited

U.S. PATENT DOCUMENTS

| 2,237,567 | 4/1941 | Land | 264/1.3 |
|---|---|---|---|
| 2,306,108 | 12/1942 | Land | 264/1.3 |
| 2,328,219 | 8/1943 | Land | 264/1.3 |
| 4,229,498 | 10/1980 | Suzuki | 428/212 |
| 4,230,768 | 10/1980 | Hamada | 428/352 |
| 4,268,127 | 5/1981 | Oshima | 350/337 |
| 4,345,000 | 8/1982 | Kawazoe | 428/212 |
| 4,387,133 | 7/1983 | Ichikawa | 428/215 |

*Primary Examiner*—Ellis P. Robinson
*Attorney, Agent, or Firm*—Sughrue, Mion, Zinn, Macpeak and Seas

[57] ABSTRACT

A polarizing film comprising (a) a polarizer and (b) a film formed on at least one surface of the polarizer from a member selected from the group consisting of thermoplastic polycarbonates, polysulfones, polyethersulfones, polyesters, polyamides and poly(estercarbonate)s' and having a retardation δ of about 500 nm or less with the retardation δ being calculated by the following equation:

$$\delta = \Delta n \cdot d$$

wherein δ is the value at which the polarizing direction of the incident light is directed 45° to the longitudinal axis direction of the film, Δn is a birefringence and d is a thickness of the film in m.

4 Claims, No Drawings

POLARIZING FILM

FIELD OF THE INVENTION

The present invention relates to a polarizing film having excellent transparency, heat resistance, water resistance (particularly hot water resistance and moisture resistance under heating), and dimensional stability.

BACKGROUND OF THE INVENTION

Liquid crystal displays have conventionally been mainly employed in digital watches, portable electronic computers and the like. However, liquid crystal displays have recently been utilized in the fields in which higher stability is required, such as displays in meters of automobiles, outdoor displays, etc.

The polarizing film used in the liquid crystal display system has a protective layer formed on at least one surface of a polarizer so that the life of the polarizer is prolonged.

Hitherto, various literature references have described that many plastic films, glass, etc., can be used as the protective layer, if such cellulose ester films are optically transparent. However, actually, only cellulose ester films and polyacrylic resin films have been practically used. The reasons for this is these resins not only have excellent optical transparency but also have a low degree of orientation and can be easily coated on the polarizer and hardened.

However, cellulose esters and polyacrylic resins practically used do not always have sufficient heat resistance, water resistance and dimentional stability as a polarizing film, and, therefore, there is a problem in that it is difficult to use these materials in display systems to be used under severe conditions such as displays in meters of automobiles, outdoor displays, etc. Accordingly, improvement in the protective layer has been desired.

SUMMARY OF THE INVENTION

In view of the above circumstances, extensive investigations have been made on a protective layer which has excellent heat resistance, water resistance, and dimensional stability and does not exhibit a coloration phenomenon due to a retardation when it is combined with a polarizer. As a result, it has now been found that a film composed of a resin having specific physical properties is suitable as a protective layer. Thus, the present invention has been accomplished.

Therefore, an object of the present invention is to provide a polarizing film comprising a polarizer and a film, formed on at least one surface of the polarizer, with a retardation δ of about 500 nm or less selected from the group consisting of thermoplastic polycarbonates, polysulfones, polyethersulfones, polyesters, polyamides, and poly(ester-carbonate)s'.

DETAILED DESCRIPTION OF THE INVENTION

Examples of the polarizers which can be used in the present invention are iodine and/or dichroic dye-type polarizers prepared by adsorbing iodine and/or a dichroic dye into a film such as a polyvinyl alcohol film, a partially formalated polyvinyl alcohol film, a saponified film of ethylene-vinyl acetate copolymer or the like, and elongating the film; polyene-type polarizers prepared by dehydration treatment of a polyvinyl alcohol film; polyene and dichroic dye-type polarizers prepared by adsorbing a dye into a polyene-type polarizer while and/or after relaxing the polarizer in a hot water and elongating the polarizer; etc. The iodine-type, dye-type and polyene-type polarizers are disclosed in, for example, U.S. Pat. Nos. 2,237,567, 2,328,219 and 2,306,108, respectively. Of these polarizers, polyene-type polarizers are preferred because they have excellent heat resistance and hot water resistance.

The film formed on at least one surface of the polarizer is a film produced from a member selected from the group consisting of thermoplastic polycarbonates, polysulfones, polyethersulfones, polyesters, polyamides and poly(ester-carbonate)s'.

Suitable examples of polycarbonates are ones having a water absorption ratio of about 0.15 to 0.5%, a transmittance of about 89 to 93% and heat deformation temperature of about 132° to 150° C. Suitable examples of polysulfones are ones having a water absorption ratio of about 0.18 to 0.25%, a transmittance of about 88 to 92% and a heat deformation temperature of about 170° to 180° C. Suitable examples of polyethersulfones are ones having a water absorption of about 0.25 to 0.5%, a transmittance of about 88 to 92% and a heat deformation temperature of about 200° to 220° C. Suitable examples of polyesters are ones having a water absorption ratio of about 0.15 to 2%, a transmittance of about 85 to 92% and a heat deformation temperature of about 85° to 150° C., though those characteristics vary depending upon the crystallinity. Suitable examples of polyamides are ones having a water absorption ratio of about 1 to 10%, a transmittance of about 65 to 90% and a heat deformation temperature of about 65° to 134° C., though those characteristics vary depending upon the crystallinity thereof. Suitable examples of poly(ester-carbonate)s' are ones having a water absorption ratio of about 0.15 to 0.5%, a transmittance of about 85 to 90% and a heat deformation temperature of about 110° to 175° C.

The film is formed on at least one surface of the polarizer by forming a film of the above-described resin and bonding the resulting film to the polarizer using a bonding means such as an adhesive, welding, etc., or dissolving the above-described resin in a solvent which does not damage the polarizing ability to prepare a polymer solution, casting the polymer solution onto the surface of the polarizer and drying the film.

The film formed on at least one surface of the polarizer by adhesion or casting must have a retardation which is represented by a product of the birefringence measured by the Senarmont method as disclosed in, e.g., *J. Appl. Phys.*, 4 138 (1953), and the thickness of the film, of about 500 nm or less and preferably 100 nm or less.

The retardation δ is the value at which the polarizing direction of the incident light is directed 45° to the longitudinal axis direction of the film and such is calculated using the following equation:

$$\delta = \Delta n \cdot d$$

wherein $\Delta n$ represents a birefringence and d represents a thickness (in m) of the film. The birefringence $\Delta n$ varies depending upon the degree of orientation of the film, and the value of $\Delta n$ increases as the degree of orientation increases. Therefore, in order to reduce the value of $\Delta n$, it is preferred for the film to have a low degree of orientation or substantially no orientation.

Most commercially available thermoplastic polycarbonate films, polysulfone films, polyethersulfone films, polyester films, polyamide films and poly(estercarbonate) films sometimes have a high degree of orientation and the process for producing these films cannot be directly used. However, these films can be used by subjecting such to, for example, a heat treatment to remove or reduce the degree of orientation.

Although the thickness (d) of the film is not restricted theoretically if $\Delta n$ is 0 (zero), it is preferred from various standpoints such as economics of the polarizing film, self-supporting properties of the polarizing film and a space factor of the liquid crystal display device in which the polarizing film is arranged for the thickness of the film to about 0.01 to about 1.0 mm.

It is most preferred for the polarizer and the film to be bonded such that directions of orientation thereof coincide. It has been experimentally determined that sufficient optical characteristics can be obtained without any substantial influence from the mutual directional relationship if the retardation $\delta$ of the film is about 10 nm or less, but sufficient optical characteristics cannot be obtained and coloration occurs if the angle of mutual orientation axes is not about 5° or less when $\delta$ is in the vicinity of 100 nm and is not about 3° or less when $\delta$ is in the vicinity of 500 nm.

The polarizing film of the present invention has excellent optical transparency as well as excellent heat resistance and water resistance (moisture resistance under heating) due to use of a film of resins having specified properties as a protective layer. Further, the polarizing film of the present invention has an appropriate stiffness and the handling thereof is easy.

The present invention is now explained in greater detail by reference to the following examples and reference examples. Unless otherwise indicated, all percents, parts, ratios and the like are by weight.

EXAMPLE 1

A thermoplastic polycarbonate film having a thickness of 50$\mu$ and a retardation of 641 nm was heat treated at 160° C. for 30 minutes and at 150° C. for 1 hour to obtain a film having a retardation of 110 nm.

Then, the resulting film was adhered to both surfaces of a polyene-type polarizer prepared by dehydrating a polyvinyl alcohol film using an epoxy resin adhesive in a manner such that the orientation axis of the film was parallel to the absorption axis of the polarizer to obtain a polarizing film.

EXAMPLE 2

A thermoplastic polycarbonate resin was dissolved in methylene chloride to obtain a 15% solution thereof.

The resulting solution was coated on a releasing film (a polyester film subjected to a release treatment) in a dry thickness of 60$\mu$. The film thus-coated was allowed to stand at room temperature for 5 minutes and then dried at 65° C. for 10 minutes to obtain a casting film having a retardation of 5 nm.

The casting film was adhered to both surfaces of a polyene-type polarizer prepared by dehydrating a polyvinyl alcohol film using a polyurethane resin adhesive to obtain a polarizing film.

EXAMPLE 3

To both surfaces of a dichroic dye-type polarizer wherein Direct Black (Color Index 51) was adsorbed in a polyvinyl alcohol film having a saponification value of 99.9%, the thermoplastic polycarbonate casting film (retardation: 5 nm) as used in Example 2 was bonded using a polyurethane resin adhesive to obtain a polarizing film.

REFERENCE EXAMPLE 1

A cellulose ester film having a thickness of 80$\mu$ was adhered to both surfaces of a polyene-type polarizer prepared by dehydrating a polyvinyl alcohol film using an epoxy resin adhesive to obtain a polarizing film.

EXAMPLE 4

To both surfaces of a polyene-type polarizer as used in Example 1, uniaxially elongated polyethylene terephthalate film was adhered with polyacrylic-polyurethane resin in the manner such that the orientation axis of the film was parallel to the absorption axis of the polarizer to obtain a polarizing film.

EXAMPLE 5

A polysulfone film having a thickness of 65$\mu$ and a retardation of 580 nm was heat treated at 180° C. for 30 minutes to obtain a film having a retardation of 386 nm.

Then, the resulting film was adhered to both surfaces of a polyene-type polarizer, prepared by dehydrating a polyvinyl alcohol film, using an epoxy resin adhesive in the manner such that the orientation axis of the film was parallel to the absorption axis of the polarizer to obtain a polarizing film.

EXAMPLE 6

A polyester resin was dissolved in o-chlorophenol to obtain a 10% solution thereof.

The resulting solution was cast onto a glass plate and dried at 40° C. to obtain a casting film having a retardation of 8 nm.

The casting film was adhered to both surfaces of the polarizer as used in Example 5 using an epoxy resin adhesive to obtain a polarizing film.

EXAMPLE 7

A polyamide resin was dissolved in m-cresol to obtain an 8% solution thereof.

The resulting solution was cast onto a glass plate and then dried at 160° C. to obtain a casting film having a thickness of 25$\mu$ and a retardation of 8 nm.

The casting film was adhered to both surfaces of a dye-type polarizer prepared by adsorbing a dichroic dye in a polyvinyl alcohol film using an epoxy resin adhesive to obtain a polarizing film.

REFERENCE EXAMPLE 2

A cellulose ester film was adhered to both surfaces of the dye-type polarizer as described in Example 7 to obtain a polarizing film.

EXAMPLE 8

To both surfaces of an iodine-type polarizer prepared by adsorbing iodine in a PVA film and elongating the film 4 times, polycarbonate film as used in Example 1 was adhered with polyacrylic-polyurethane resin to obtain a polarizing film.

REFERENCE EXAMPLE 3

Polyacrylic resin film having a thickness of 50$\mu$ was adhered to both surfaces of an iodine-type polarizer as used in Example 8 to obtain a polarizing film.

The degree of polarization and percent dimensional shrinkage in each of the polarizers obtained in Examples 1 to 8 and Reference Examples 1 to 3 were measured and the results obtained are shown in the Table below.

The degree of polarization was calculated from the average transmission with axes parallel and with axes crossed measured at every 50 nm in the range of 400 nm to 700 nm on the basis of the following equation:

$$P = \sqrt{\frac{H_0 - H_{90}}{H_0 + H_{90}}} \times 100 \, (\%)$$

wherein P is a degree of polarization, $H_0$ is the average transmission with axes parallel, and $H_{90}$ is the average transmission with axes crossed.

The transmittance of the polarizing films adjusted to 43%.

TABLE

|  | Examples | | | | Reference Example 1 | Examples | | | Reference Example 2 | Example 8 | Reference Example 3 |
| --- | --- | --- | --- | --- | --- | --- | --- | --- | --- | --- | --- |
|  | 1 | 2 | 3 | 4 |  | 5 | 6 | 7 |  |  |  |
| Degree of Polarization (%) | | | | | | | | | | | |
| Initial | 92 | 90 | 88 | 89 | 92 | 91 | 92 | 89 | 92 | 94 | 94 |
| Heat Resistance*1 | 90 | 89 | 86 | 88 | 88 | — | — | — | — | 92 | 90 |
| Moisture Resistance under Heating*2 | 83 | 85 | 82 | 84 | 76 | 84 | 86 | 84 | 76 | 85*4 | 77*4 |
| Percent Dimensional Shrinkage (%)*3 | 0.5 or less | 0.5 or less | 0.5 or less | 0.5 or less | 5–6 or less | 0.5 or less | 0.5 or less | 0.5 or less | 5–6 or less | 0.3*4 or less | 1.0*4 or less |

Notes
*1 Test conditions: 100° C., 480 hrs
*2 Test conditions: 80° C., 95% RH, 480 hrs
*3 Test conditions: 80° C., 95% RH
*4 Test conditions: 60° C., 95% RH, 250 hrs It is clear from the results in the Table above that the polarizing films using as a protective layer a film composed of a resin having a retardation of about 500 nm or less selected from the group consisting of thermoplastic polycarbonates, polysulfones, polyethersulfones, polyesters, polyamides and poly(ester-carbonate)s' show a sufficient degree of polarization, have excellent moisture resistance under heating and undergo no substantial dimensional shrinkage.

While the invention has been described in detail and with reference to specific embodiments thereof, it will be apparent to one skilled in the art that various changes and modifications can be made therein without departing from the spirit and scope thereof.

What is claimed is:

1. A polarizing film comprising (a) a polarizer and (b) a heat-treated film formed on at least one surface of the polarizer from a member selected from the group consisting of thermoplastic polycarbonates, polysulfones, polyethersulfones, polyesters, polyamides and poly(estercarbonate)s' and having a retardation δ of about 500 nm or less with the retardation δ being calculated by the following equation:

$$\delta = \Delta n \cdot d$$

wherein δ is the value at which the polarizing direction of the incident light is directed 45° to the longitudinal axis direction of the film, Δn is the birefringence of the film and d is a thickness of the film in meters.

2. The polarizing film of claim 1, wherein said retardation is 100 nm or less.

3. The polarizing film of claim 1, wherein said film (b) has a thickness of about 0.01 to about 1.0 mm.

4. The polarizing film of claim 1, wherein said polarizer is an iodine and/or dichroic dye polarizer, a polyene polarizer or a polyene and dichroic dye polarizer.

* * * * *